(12) United States Patent
Burt et al.

(10) Patent No.: US 11,192,537 B2
(45) Date of Patent: Dec. 7, 2021

(54) METHODS AND SYSTEM FOR ENGINE BRAKING

(71) Applicant: Ford Global Technologies, LLC, Dearborn, MI (US)

(72) Inventors: Andrew E. Burt, Royal Oak, MI (US); Minku Lee, Ypsilanti, MI (US); Joshua Dewalt, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 548 days.

(21) Appl. No.: 16/218,387

(22) Filed: Dec. 12, 2018

(65) Prior Publication Data

US 2020/0189556 A1 Jun. 18, 2020

(51) Int. Cl.
| | |
|---|---|
| *G06F 7/70* | (2006.01) |
| *B60W 10/196* | (2012.01) |
| *B60T 1/10* | (2006.01) |
| *B60T 8/171* | (2006.01) |
| *B60T 17/22* | (2006.01) |

(52) U.S. Cl.
CPC .......... *B60W 10/196* (2013.01); *B60T 1/10* (2013.01); *B60T 8/171* (2013.01); *B60T 17/22* (2013.01); *B60T 2201/04* (2013.01); *B60W 2510/1005* (2013.01); *B60W 2510/244* (2013.01); *B60W 2540/10* (2013.01); *B60W 2540/12* (2013.01); *B60W 2555/20* (2020.02)

(58) Field of Classification Search
CPC ........ B60W 10/196; B60T 1/10; B60T 8/171; B60T 17/22
See application file for complete search history.

(56) References Cited

U.S. PATENT DOCUMENTS

| | | | |
|---|---|---|---|
| 6,205,374 B1 | 3/2001 | Kljima et al. | |
| 7,131,708 B2 | 11/2006 | Tao et al. | |
| 8,924,061 B2 | 12/2014 | Reed et al. | |
| 10,023,179 B2 | 7/2018 | Shakiba-Herfeh et al. | |
| 2005/0151420 A1 | 7/2005 | Crombez et al. | |
| 2009/0145673 A1 | 6/2009 | Soliman et al. | |
| 2013/0139776 A1* | 6/2013 | Pursifull | F02N 11/0844 123/179.3 |
| 2013/0297161 A1* | 11/2013 | Gibson | B60W 30/18118 701/54 |
| 2015/0251657 A1 | 9/2015 | Johri et al. | |
| 2018/0244263 A1 | 8/2018 | Bower et al. | |

* cited by examiner

*Primary Examiner* — Adam M Alharbi
(74) *Attorney, Agent, or Firm* — David Kelley; McCoy Russell LLP

(57) ABSTRACT

Systems and methods for operating a hybrid powertrain or driveline that includes an engine and an integrated starter/generator are described. In one example, rotation of an automatically stopped engine may be inhibited when engine braking is requested so that the engine may not be rotated without providing a desired outcome.

20 Claims, 4 Drawing Sheets

METHODS AND SYSTEM FOR ENGINE BRAKING

FIELD

The present description relates to methods and a system for operating a powertrain of a hybrid vehicle. The methods and systems may be particularly useful for hybrid vehicles that include engine braking.

BACKGROUND AND SUMMARY

A hybrid powertrain or driveline may include an engine and an integrated starter/generator (ISG). The engine and the ISG may provide power to propel the vehicle, and the engine and the ISG may also provide driveline braking power to slow the vehicle and provide a desired rate of vehicle deceleration during low driver demand power operating conditions. The ISG may preferably provide driveline braking power as compared to the engine since the ISG may convert the vehicle's kinetic energy into electric energy. However, if state of charge (SOC) of an electric energy storage device is high when driveline braking is desired or requested, then the ISG may not be able to provide a desired level of driveline braking by itself because there may be no capacity to store the electric energy generated via the ISG. Further, the electric energy storage device may be capacity limited such that it may only accept a threshold amount of electric power during driveline braking conditions because of electric energy storage device power limits. If the ISG lacks capacity to generate the requested or desired amount of driveline braking, the engine may provide additional driveline braking. However, if the driver demand power is low for only a short period of time, it may not be desirable to rotate the engine and provide engine braking since fuel may be consumed to accelerate the engine to the speed of the ISG before engine braking may be provided. Further, vehicle emissions may increase without providing the benefit of engine braking for any meaningful period of time. Therefore, it may be desirable to provide a way of discerning whether or not beginning to rotate an engine that has stopped rotating is expected to be beneficial so that engine rotation may be inhibited or permitted.

The inventors herein have recognized the above-mentioned issues and have developed a powertrain operating method, comprising: via a controller, inhibiting rotation of an engine that has stopped rotating during conditions when engine braking is desired, except when input is received to the controller via a human/machine interface; and rotating the engine that has stopped rotating and initiating engine braking in response to the indication to permit engine braking.

By inhibiting rotation of an engine that has stopped rotating during conditions when engine braking is desired, except when input is received to a controller via a human/machine interface, it may be possible to reduce the possibility of rotating the engine and having the engine stop rotating before benefits of rotating the engine may be realized. For example, if engine braking is requested in response to low driver demand power, rotation of an engine that has stopped rotating may be inhibited or prevented so that the engine does not run up to ISG speed and then stop rotating again before much benefit may be provided. However, if the vehicle's human driver adjusts a position of a gear shift selector or other human/machine interface, then the engine may be rotated and brought up to speed of the ISG responsive to the gear shift selector state change. The gear shift state change may provide an indication from the vehicle's human driver that a longer vehicle coast (e.g., downhill) or deceleration is in progress. By rotating the engine when a longer coast or deceleration is in progress, it may be possible to slow the vehicle via engine braking without brake wear and higher engine emissions that may provide less value.

The present description may provide several advantages. In particular, the approach may reduce engine emissions while allowing engine braking. The approach may also increase vehicle brake life while improving vehicle occupant's perception of vehicle operation. Further, the approach may reduce vehicle fuel consumption and reduce driveline noise and vibration that may be perceived as unnecessary.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
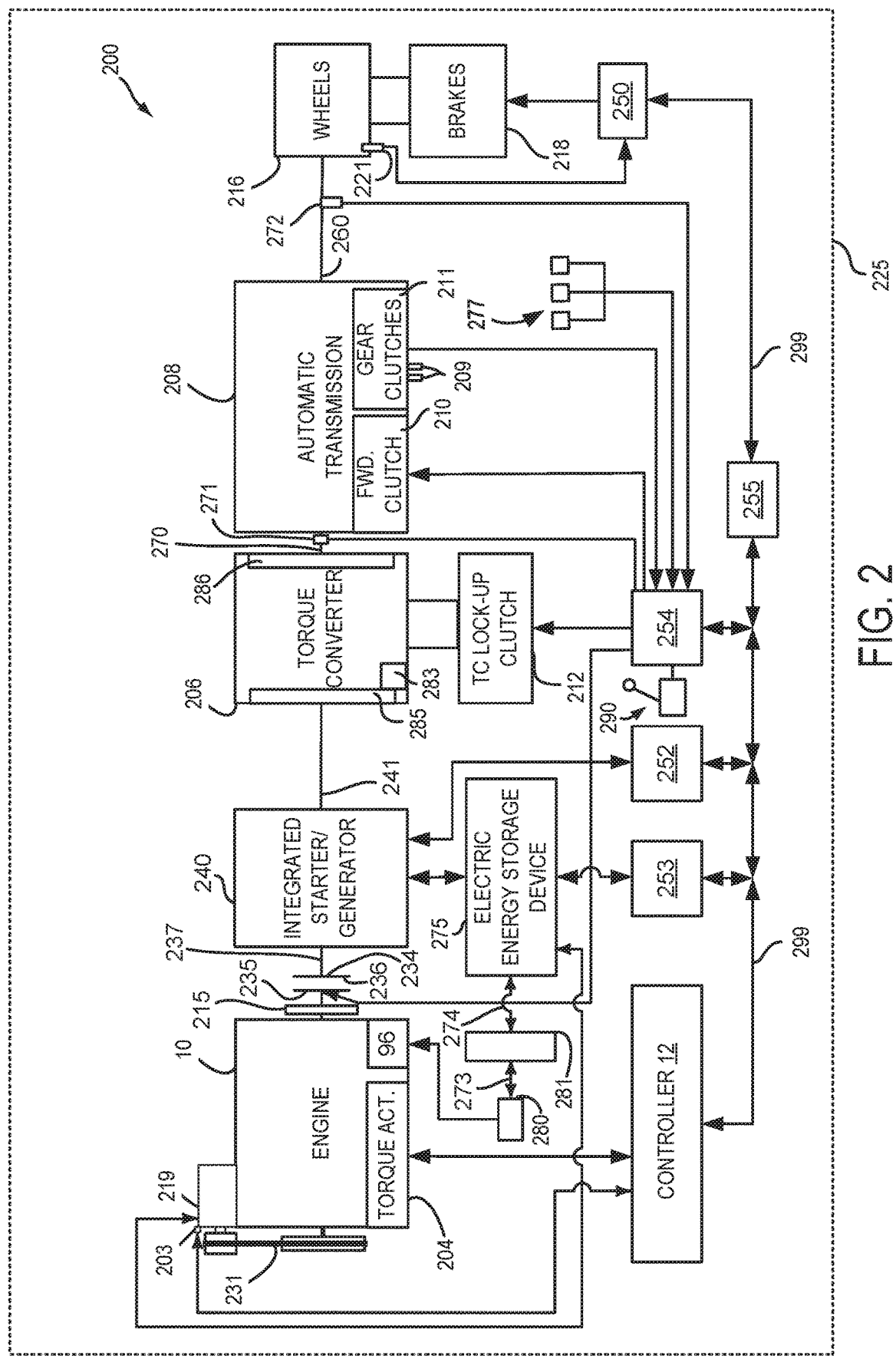
FIG. 2 is a schematic diagram of a hybrid vehicle driveline.
Figure 3:
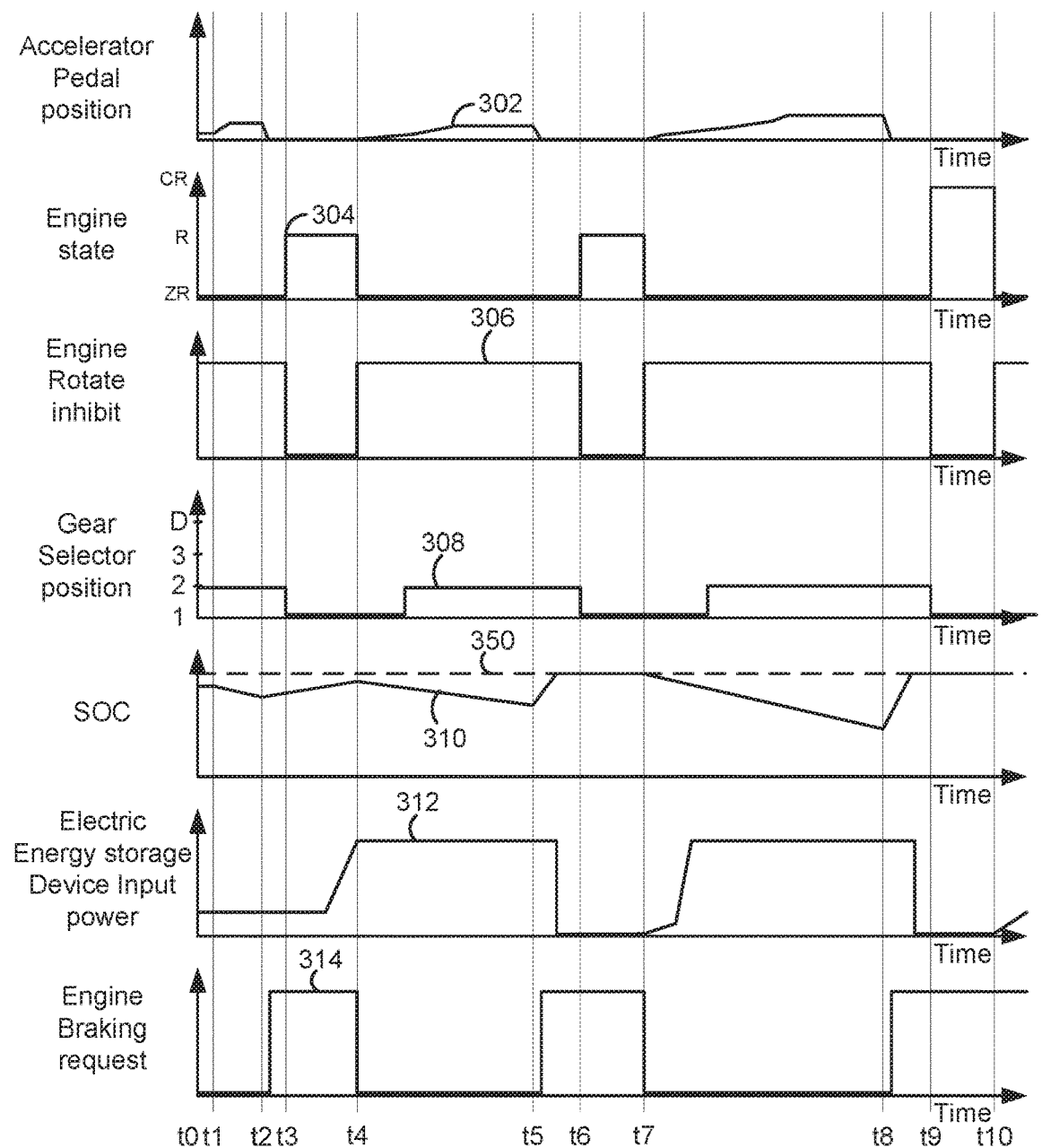
FIG. 3 shows an example driveline operating sequence.
Figure 4:
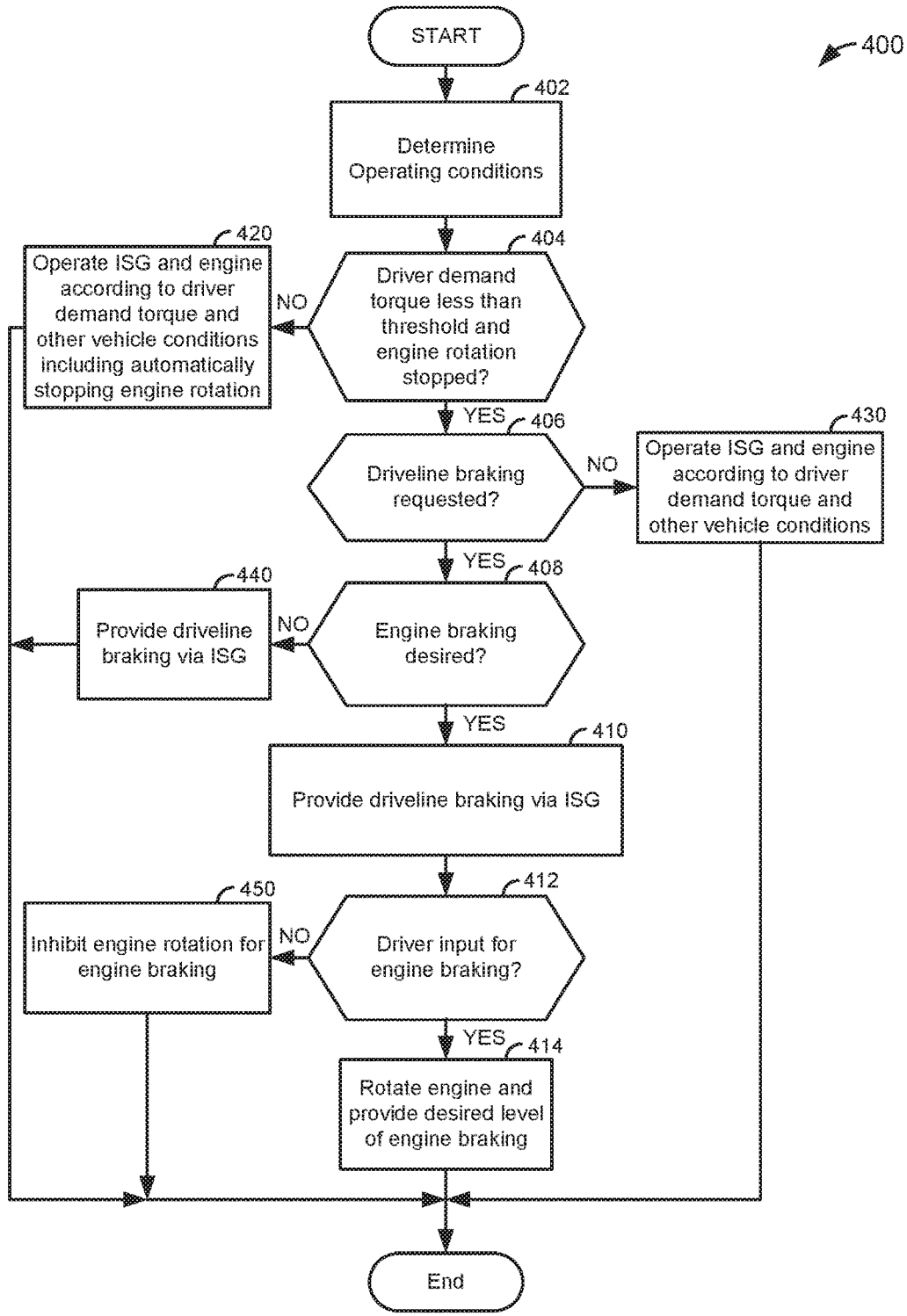
FIG. 4 shows a method for operating a driveline that includes an engine and an ISG.

The present description is related to operating an engine and an ISG that may be selectively coupled to the engine. The engine may be of the type shown in FIG. 1. The engine and the ISG may be included in a driveline of a hybrid vehicle as is shown in FIG. 2. The ISG may be selectively coupled to the engine via a driveline disconnect clutch. The engine may be selectively rotated to generate engine braking responsive to input provided by vehicle passengers. An example operating sequence for the driveline is shown in FIG. 3. A method for operating the driveline is shown in FIG. 4.

Figure 1:
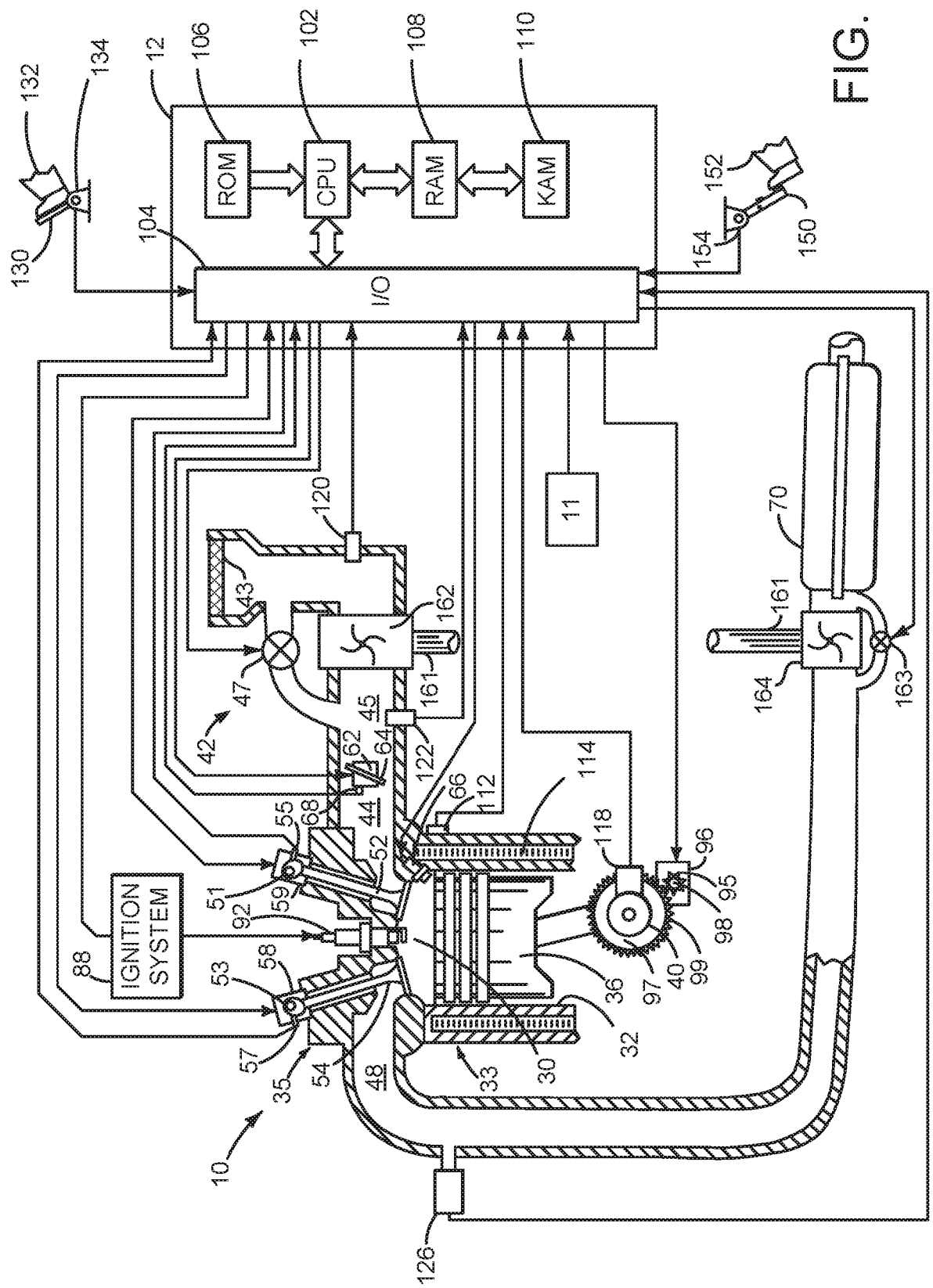
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2 and employs the actuators shown in FIGS. 1 and 2 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known device. The human driver may also request a particular driveline operating mode via human/machine interface 11. For example, a human driver may request a hill descent mode where vehicle speed is controlled during descent of a hill. The hill descent speed may be controlled via shifting transmission gears, entering the driveline into a regeneration mode whereby the driveline produces electric power via ISG 240 of FIG. 2. The human driver may also select other driveline operating modes via the human/machine interface 11. For example, the human driver may select a "off road" mode, a "sand" mode, a "mud" mode, and an "on road" mode.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

BISG is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Power converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift lever may include positions for gears 1-N (where N is the an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine; an integrated starter/generator (ISG) selectively coupled to the engine via a driveline disconnect clutch; and a controller including executable instructions stored in non-transitory memory to rotate the engine from a non-rotating state in response to an engine braking request and an input received from a human, and not rotating the engine from the non-rotating state in response to the engine braking request and an absence of the input received from the human. The system includes where the input is an adjustment of a state of a gear shift selector. The system includes where the input is an adjustment of a state of a driveline mode selector. The system further comprises additional instructions to automatically stop the engine in the non-rotating state. The system further comprises additional instructions to rotate the engine at a rotational speed of the ISG in response to the engine braking request and the input received from the human. The system further comprises additional instructions to provide driveline braking via the ISG in response to a driveline braking request. The system further comprises additional instructions to generate the engine braking request via the driveline braking request.

Referring now to FIG. 3, example plots of a vehicle operating sequence are shown. The operating sequence may be performed via the system of FIGS. 1 and 2 in cooperation with the method of FIG. 4. Vertical lines at times t0-t10 represent times of interest during the sequence. The plots in FIG. 3 are time aligned and occur at the same time.

The first plot from the top of FIG. 3 is a plot of engine speed versus time. The vertical axis represents accelerator pedal position and accelerator pedal position increases in the direction of the vertical axis arrow. The horizontal axis represents time and time increases from the left side of the figure to the right side of the figure. Solid line 302 represents accelerator pedal position.

The second plot from the top of FIG. 3 is a plot of engine operating state versus time. The engine may have three operating states including zero rotation (ZR), rotation without combusting fuel (R), and rotation with combustion of fuel (CR). Rotation with combustion of fuel may include combusting in all of the engine's cylinders or combusting in fewer cylinders than all of the engine's cylinders. The horizontal axis represents time and time increases from the left side of the figure to the right side of the figure. Solid line 304 represents the engine operating state.

The third plot from the top of FIG. 3 is a plot of a state that indicates when prohibition of engine rotation is asserted or not asserted. The state of prohibition or preventing engine rotation is asserted when trace 306 is at a higher level near the vertical axis arrow. The state of prohibition or preventing engine rotation is not asserted when trace 306 is at a lower level near the horizontal axis. The horizontal axis represents time and time increases from the left side of the figure to the right side of the figure. Solid line 308 represents the state of whether or not prohibition of engine rotation is asserted or activated.

The fourth plot from the top of FIG. 3 is a plot of gear selector position versus time. The gear selector positions indicate which gear is being requested by the human driver and the gear selector positions are indicated along the vertical axis. The letter "D" indicates drive where any of the transmissions forward gears may be engaged to propel the vehicle. Numbers 1-3 indicate manual selection of $1^{st}$, $2^{nd}$, and $3^{rd}$ gears. The horizontal axis represents time and time increases from the left side of the figure to the right side of the figure. Solid line 310 represents the gear selector position.

The fifth plot from the top of FIG. 3 is a plot of electric energy storage device (e.g., 275 of FIG. 2) state of charge (SOC) versus time. The vertical axis represents SOC and SOC increases in the direction of the vertical axis arrow. The horizontal axis represents time and time increases from the left side of the figure to the right side of the figure. Solid line 310 represents SOC. Horizontal line 350 represents an upper limit not to be exceeded threshold SOC for the electric energy storage device.

The sixth plot from the top of FIG. 3 is a plot of electric energy storage device input power limit or threshold versus time. The vertical axis represents an amount of electric power that may be input to an electric energy storage device and the amount of electric power increases in the direction of the vertical axis arrow. The horizontal axis represents time and time increases from the left side of the figure to the right side of the figure. Solid line 312 represents a threshold amount of electric power that may be input to the electric energy storage device (e.g., 275 of FIG. 2) and that may not be exceeded.

The seventh plot from the top of FIG. 3 is a plot of an engine braking request and the engine braking request is asserted when trace 314 is at a higher level near the vertical axis arrow. The engine braking request is not asserted when trace 314 is near the horizontal axis. The horizontal axis represents time and time increases from the left side of the figure to the right side of the figure. Solid line 314 represents the state of the engine braking request.

At time t0, the engine is not rotating and the accelerator pedal position is low and not zero. The gear selector is in second gear and the SOC is high, but the SOC is less than threshold 350. The amount of electric power that may be input to the electric energy storage device is low and engine braking is not requested.

At time t1, the human driver (not shown) applies the accelerator pedal to increase accelerator pedal position and the electric machine (not shown) accelerates the vehicle in second gear. The engine remains off and not rotating and engine rotation is inhibited. The SOC begins to decrease and the amount of power that may be input to the electric energy storage device is low. Engine braking is not requested.

Between time t1 and time t2, the accelerator pedal remains applied and the electric machine (not shown) accelerates the vehicle. The engine remains not rotating and engine rotation is inhibited. The gear selector position remains in second gear and the SOC continues to decline. The amount of electric power that may be input to the battery remains low and engine braking is not requested.

At time t2, the driver releases the accelerator pedal and driver demand power (not shown) is reduced. The engine remains not rotating and engine rotation is inhibited. The gear selector position remains in second gear and the SOC begins to increase as the ISG enters regeneration mode to converter the vehicle's kinetic energy into electric energy. The amount of electric power that may be input to the battery remains low and engine braking is not requested.

Between time t2 and time t3, the accelerator pedal is not applied and the engine is at zero speed. Engine rotation is inhibited and the gear selector remains in second gear. The SOC begins to increase as the ISG (not shown) supplies charge to the electric energy storage device. However, the electric energy storage device lacks capacity to store all the electric charge that may be generated by the ISG since the electric energy storage device power limit is low. Engine braking is requested because the ISG cannot convert enough of the vehicle's kinetic energy so that the vehicle may decelerate at a desired rate. Note that engine rotation is inhibited even though engine braking is requested. Engine rotation is inhibited so that energy may not be consumed rotating an engine for engine braking when engine braking may not provide a desired level of benefit. The vehicle controller may request application of wheel friction brakes so that a desired vehicle deceleration rate may be provided when engine braking is inhibited.

At time t3, the human driver moves the gear position selector from second gear to first gear. By moving the gear position selector from second gear to first gear, the human operator is providing an affirmative indication that engine braking is desired. As such, the request for engine braking is asserted. Alternatively, the human operator may change a vehicle operating mode, from "road" mode to "hill descent" mode for example, to indicate a request or desire for engine braking. The system may rely on the human operator for a request to provide engine braking because the human operator may wish to control vehicle speed more precisely and/or because the human operator may have better perception of driving conditions. The inhibiting of engine rotation is withdrawn and the engine begins to rotate in response to the request for engine braking and the inhibiting of engine rotation being withdrawn. The engine may be rotated and started via a starter motor (e.g., 96 of FIG. 1), a BISG (e.g., 219 of FIG. 2), or the ISG via at least partially closing the driveline disconnect clutch. The SOC continues to increase and driveline braking increases as the engine provides resistance to driveline motion.

Between time t3 and time t4, the engine continues to rotate and provide driveline braking. The compression work of the engine may be adjusted via adjusting engine valve timing so that a desired amount of engine braking may be provided. The ISG continues to supply a small amount of charge to the electric energy storage device. The SOC gradually increases and the electric energy storage device input power threshold or limit increases. Engine braking continues to be requested since regenerative braking by the ISG is limited by electric energy storage device power limits.

At time t4, the accelerator pedal is applied a second time and the engine braking request is withdrawn in response to the increase in accelerator pedal position. Engine rotation is also stopped because driver demand power is low and the ISG has capacity to propel the vehicle. The SOC begins to decline and engine rotation is inhibited. The gear selector remains in first gear and the electric energy storage device input power limit remains at a higher level.

Between time t4 and time t5, the accelerator pedal position increases and then levels off. The engine is not rotating and engine rotation is inhibited because the ISG (not shown) has capacity to propel the vehicle and driver demand power (not shown) is low. The gear shift selector is moved from first to second and SOC decreases as the ISG consumes electric power to propel the vehicle. The electric energy storage device input power limit or threshold remains at a higher level and engine braking is not requested.

At time t5, the driver releases the accelerator pedal and driver demand power (not shown) is reduced. The engine remains not rotating and engine rotation is inhibited. The gear selector position remains in second gear and the SOC begins to increase as the ISG enters regeneration mode to converter the vehicle's kinetic energy into electric energy. The amount of electric power that may be input to the battery remains high and engine braking is not requested.

Between time t5 and time t6, the accelerator pedal is not applied and the engine is at zero rotational speed. Engine rotation is inhibited and the gear selector remains in second gear. The SOC begins to increase as the ISG (not shown) supplies charge to the electric energy storage device. However, the electric energy storage device SOC reaches threshold 350 so the electric energy storage device may not accept additional electric charge from the ISG (not shown). Therefore, the electric energy storage device power limit is reduced to zero. Engine braking is requested because the ISG cannot supply electric energy to the electric energy storage device and control of vehicle deceleration is desired. However, engine rotation is inhibited even though engine braking is requested because positive affirmation of the driver's intent to allow engine braking has not been received via the vehicle controller. Engine rotation is inhibited so that energy may not be consumed rotating an engine for engine braking when engine braking may not provide a desired level of benefit. The vehicle controller may request application of wheel friction brakes so that a desired vehicle deceleration rate may be provided when engine braking is inhibited.

At time t6, the human driver moves the gear position selector from second gear to first gear. In this way, the human operator is providing positive affirmative indication that engine braking is desired. Therefore, the request for engine braking is asserted. Alternatively, the human operator may change a vehicle operating mode, from "road" mode to "hill descent" mode for example, to indicate a request or desire for engine braking. The inhibiting of engine rotation is withdrawn and the engine begins to rotate to provide engine braking in response to the request for engine braking and the inhibiting of engine rotation being withdrawn. In this example, the engine is rotating without combusting fuel. The engine may be rotated and started via a starter motor (e.g., 96 of FIG. 1), a BISG (e.g., 219 of FIG. 2), or the ISG via at least partially closing the driveline disconnect clutch. The SOC remains high and driveline braking increases as the engine provides resistance to driveline motion. The electric energy storage device power input limit or threshold is low since SOC is high. The accelerator pedal is not applied.

Between time t6 and time t7, the engine continues to rotate and provide driveline braking. The compression work of the engine may be adjusted via adjusting engine valve timing so that a desired amount of engine braking may be provided. The SOC remains high at level 350 and the electric energy storage device input power threshold or limit remains at zero. Engine braking continues to be requested since regenerative braking by the ISG is limited by electric energy storage device power limits. The accelerator pedal is not applied and the vehicle decelerates (not shown).

At time t7, the accelerator pedal is applied a third time and the engine braking request is withdrawn in response to the increase in accelerator pedal position. Engine rotation is also stopped because driver demand power is low and the ISG (not shown) has capacity to propel the vehicle. The SOC begins to decline and engine rotation is inhibited. The gear selector remains in first gear and the electric energy storage device input power limit remains at a higher level.

Between time t7 and time t8, the accelerator pedal position increases and then levels off. The engine is not rotating and engine rotation is inhibited because the ISG (not shown) has capacity to propel the vehicle and driver demand power (not shown) is low. The gear shift selector is moved from first to second and SOC decreases as the ISG consumes electric power to propel the vehicle. The electric energy storage device input power limit or threshold is increased so that the electric energy storage device may receive greater amounts of electric power. Engine braking is not requested.

At time t8, the driver releases the accelerator pedal and driver demand power (not shown) is reduced. The engine remains not rotating and engine rotation is inhibited. The gear selector position remains in second gear and the SOC begins to increase as the ISG enters regeneration mode to converter the vehicle's kinetic energy into electric energy. The amount of electric power that may be input to the battery remains high and engine braking is not requested.

Between time t8 and time t9, the accelerator pedal is not applied and the engine is at zero speed. Engine rotation is inhibited and the gear selector remains in second gear. The SOC increases as the ISG (not shown) supplies charge to the electric energy storage device. However, the electric energy storage device SOC reaches threshold 350 so the electric energy storage device may not accept additional electric charge from the ISG (not shown). Therefore, the electric energy storage device power limit is reduced to zero. Engine braking is requested because the requested amount of driveline braking (not shown) is high and the ISG cannot generate the requested amount of driveline braking. However, engine rotation is inhibited even though engine braking is requested because positive affirmation of the driver's intent to allow engine braking has not been received via the vehicle controller. Engine rotation is inhibited so that energy may not be consumed rotating an engine for engine braking when engine braking may not provide a desired level of benefit. The vehicle controller may request application of wheel friction brakes so that a desired vehicle deceleration rate may be provided when engine braking is inhibited.

At time t9, the human driver moves the gear position selector from second gear to first gear to provide positive affirmative indication that engine braking is desired. Therefore, the request for engine braking is asserted. Alternatively, the human operator may change a vehicle operating mode, from "road" mode to "hill descent" mode for example, to indicate a request or desire for engine braking. The inhibiting of engine rotation is withdrawn and the engine begins to rotate to provide engine braking in response to the request for engine braking and the inhibiting of engine rotation being withdrawn. In this example, the engine is rotating and combusting fuel. Thus, the engine may be started and the engine may warm its catalyst to a desired level to reduce emissions. Alternatively, the engine may also be started to provide heat to a passenger compartment (not shown). The engine may be rotated and started via a starter motor (e.g., 96 of FIG. 1), a BISG (e.g., 219 of FIG. 2), or the ISG via at least partially closing the driveline disconnect clutch. The SOC remains high and driveline braking increases as the engine provides resistance to driveline motion. The electric energy storage device power input limit or threshold is low since SOC is high. The accelerator pedal is not applied.

Between time t9 and time t10, the engine continues to rotate and provide driveline braking. The compression work of the engine may be adjusted via adjusting engine valve timing so that a desired amount of engine braking may be provided. The SOC remains high at level 350 and the electric energy storage device input power threshold or limit remains at zero. Engine braking continues to be requested since regenerative braking by the ISG is limited by electric energy storage device power limits. The accelerator pedal is not applied and the vehicle decelerates (not shown).

At time t10, engine braking is no longer requested because vehicle speed is less than a threshold speed (not shown). The accelerator pedal is not applied and the engine braking request is withdrawn in response to the low vehicle speed (not shown). Engine rotation is also stopped because driver demand power is low and the ISG (not shown) has capacity to propel the vehicle if the driver demand power subsequently increases. The SOC is at a higher level and engine rotation is inhibited. The gear selector remains in first gear and the electric energy storage device input power limit remains at a higher level.

In this way, rotation of an engine that has stopped may remain stopped unless or until a human operator provides a request for engine braking. If the human operator does not request engine braking, then friction wheel brakes may be applied by the vehicle controller to provide a desired vehicle deceleration rate. If the human operator requests engine braking, then the stopped engine may be rotated and started so that it may provide engine braking when engine braking is requested. Such operation may be beneficial when the human driver has information that may not be available to the vehicle (e.g., traffic patterns, driving terrain, road surface conditions, etc.).

Referring now to FIG. 4, a flow chart of a method for operating a hybrid vehicle driveline is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 determines operation conditions. Operating conditions may include but are not limited to engine speed, BISG power, ISG power, driver demand power, brake pedal position, electric energy storage device input and output power limits, engine load, ambient temperature, ambient pressure, vehicle speed, and BISG speed. Method 400 proceeds to 404.

At 404, method 400 judges if driver demand power is less than a threshold amount of power and if engine rotation is stopped. Alternatively, method 400 may judge if driver demand torque is less than a threshold amount of torque and if engine rotation is stopped. Driver demand power and driver demand power may be determined via referencing a table or function that holds empirically determined values of driver demand power via accelerator pedal position and vehicle speed. The table or function outputs an empirically determined driver demand power or driver demand power. Method 400 may determine if engine rotation is stopped via output of an engine position sensor. If method 400 judges that driver demand power is less than a threshold and engine rotation is stopped, then the answer is yes and method 400 proceeds to 406. Otherwise, the answer is no and method 400 proceeds to 420. Alternatively, if method 400 judges that driver demand torque is less than a threshold and engine rotation is stopped, then the answer is yes and method 400 proceeds to 406. Otherwise, the answer is no and method 400 proceeds to 420.

At 420, method 400 operates the ISG and engine according to driver demand power or torque and vehicle operating conditions. For example, if driver demand power is greater than a threshold amount of power, the engine may be activated (e.g., rotating and combusting fuel) and the engine only, or the engine and the ISG, may provide positive power to the driveline and wheels. Conversely, if the driver demand power is less than a threshold and electric energy storage device SOC is greater than a threshold, the engine may be stopped (e.g., zero rotation and no combustion), the driveline disconnect clutch fully opened, and the ISG may be the sole source of propulsion power to the driveline and wheels. Method 400 proceeds to exit.

At 406, method 400 judges if driveline braking is requested. Driveline braking may be requested when driver demand power is less than a threshold power and vehicle speed is greater than a threshold vehicle speed. In addition, other conditions may have to be met to for the controller (e.g., vehicle controller 255 of FIG. 2) to request driveline braking. For example, the driveline braking power may have to be less than the threshold power for longer than a predetermined amount of time to request driveline braking. Method 400 may also determine the desired or requested amount of driveline braking at 406. In one example, an amount of driveline braking may be determined by referencing a table or function of empirically determined driveline braking power amounts via driver demand power and vehicle speed. The table or function outputs the requested driveline braking power amount. If driveline braking is requested, then the answer is yes and method 400 proceeds to 408. Otherwise, the answer is no and method 400 proceeds to 430.

At 430, method 400 operates the ISG and engine according to driver demand power or power and vehicle operating conditions. For example, method 400 may provide the requested amount of driver demand power solely via the ISG to the driveline. If driver demand power is zero, then the ISG may freewheel without generating electric power and without consuming electric power. The engine remains in a stopped state (e.g., not rotating) and the driveline disconnect clutch remains open. Method 400 proceeds to exit.

At 408, method 400 judges if engine braking is requested. Engine braking may be requested if the ISG lacks capacity to produce the requested amount of driveline braking power. The ISG may lack capacity to produce the requested amount of driveline braking power if the driveline braking power exceeds capacity of the ISG. For example, if the driveline braking power is 100 Newton-meters (Nm) and the ISG has a maximum generating mode power of 75 Nm, then 25 Nm of power may be requested as engine braking power so that the 100 Nm of driveline braking power may be provided. The ISG may also lack capacity to produce the requested amount of driveline braking power if output of the ISG exceeds an electric energy storage device input power threshold. Further, the ISG may also lack capacity to produce the requested amount of driveline braking power if SOC of the electric energy storage device is greater than a threshold SOC. In one example, the requested engine braking amount may be determined via equation 1:

$$RE\_brk\_pow = RD\_brk\_pow - RISG\_brk\_pow \quad (1)$$

where RE_brk_pow is the requested amount of engine braking power, RD_brk_pow is the requested amount of driveline braking power, and RISG_brk_pow is the amount of requested ISG braking power. The requested amount of ISG power may be determined as a function of ISG temperature, electric energy storage device input power limits (e.g., not to exceed thresholds), and requested driveline braking power. If the ISG may provide all of the requested driveline braking power, then engine braking power may not be requested. Otherwise, if the value of RE_brk_pow is non-zero, engine braking power may be requested. If engine braking power is requested, the answer is yes and method 500 proceeds to 410. Otherwise, the answer is no and method 400 proceeds to 440.

At 440, method 400 provides driveline braking solely via the ISG. The engine does not rotate and the ISG provides regenerative braking up to power input limits of the electric energy storage device and up to the power output limits of the ISG. For example, if 2 kilowatts of driveline braking power is requested and the input power limit (e.g., power input not to be exceeded) of the electric energy storage device is 1.5 kilowatts, then the ISG may provide nearly 1.5 kilowatts of driveline braking. On the other hand, if 2 kilowatts of driveline braking power is requested and the input power limit (e.g., power input not to be exceeded) of the electric energy storage device is 2.5 kilowatts and the regenerative braking capacity of the ISG is 1.8 kilowatts, then the ISG may provide 1.8 kilowatts of driveline braking power. If 1 kilowatt of driveline braking power is requested and the input power limit (e.g., power input not to be exceeded) of the electric energy storage device is 2.5 kilowatts and the regenerative braking capacity of the ISG is 1.8 kilowatts, then the ISG may provide 1 kilowatt of driveline braking power. If the ISG does not have capacity to provide the desired level of driveline braking power, wheel brakes may be engaged so that the level of requested braking is delivered by the vehicle. The amount of ISG braking power that may provided to the driveline may be determined via equation 2:

$$RISG\_brk\_pow = f(RD\_brk\_pow, EP\_pow\_lim, ISG\_pow\_lim) \quad (2)$$

where RISG_brk_pow is the requested or desired amount of ISG braking power that is provided to the driveline, RD_brk_pow is the requested amount of driveline braking power, EP_pow_lim is the electric energy storage system input power limit (e.g., the amount of input electric power that is not to be exceeded), ISG_pow_lim is the ISG regenerative output power limit (e.g., a limit of the amount of mechanical power that the ISG may extract from the driveline that is not to be exceeded), and f is a function that returns empirically determined values of requested ISG braking power. Method 400 provides driveline braking solely via the ISG and then exits.

At 410, method 400 determines an amount of requested ISG braking power. The amount of requested ISG braking power may be determined via equation 2, which is described at 440. Method 400 proceeds to 412.

At 412, method 400 judges if a human driver has provided an indication that engine braking power is desired or requested. In one example, a request for engine braking power may be manifest as a change or adjustment to a position of a gear shift selector. For example, if a human driver changes from a gear shift selector position for third gear to a gear shift selector position for second gear, then the movement of the gear shift selector may be interpreted as a request for engine braking. In another example, if a human driver changes from a driveline operating mode (e.g., from "road" mode to "hill descent" mode), then the driveline mode change may be interpreted as a request for engine braking. In still another example, if a human driver requests a change of a simulated gear for a continuously variable transmission (CVT), then the request for the change in simulated gear may be interpreted as a request for engine braking. If method 500 judges that human driver input has been received that may be interpreted as a request for engine braking, then the answer is yes and method 400 proceeds to 414. Otherwise, the answer is no and method 400 proceeds to 450.

At 450, method 400 inhibits engine rotation when driver demand power is less than a threshold amount of power and when engine rotation is already ceased even though engine braking may be requested via the controller to meet requested driveline braking. In one example, engine rotation may be inhibited via preventing the engine to be cranked via a starter (e.g., 96 of FIG. 1), preventing partial and full closing of the driveline disconnect clutch, and preventing cranking of the engine via the BISG. Engine cranking and rotation may be prevented via adjusting a value of a variable in controller memory that prevents engine rotation while engine rotation is stopped and while driver demand power is less than a threshold. Engine rotation may be permitted when driver demand power exceeds a threshold and/or when electric energy storage device SOC is greater than a threshold. Method 400 proceeds to exit.

At 414, method 400 rotates the engine and provides the requested amount of engine braking power when the engine has the capacity to provide the requested amount of engine braking power. The driveline disconnect clutch is also fully closed to provide the requested engine braking power. The engine may be rotated via a starter motor, BISG, or via the ISG and closing the driveline disconnect clutch. The engine may be started (e.g., combustion of fuel is present in engine cylinders) and one or more engine cylinders may be deactivated (e.g., not combusting fuel in the deactivated cylinders) when the engine is rotated to provide the requested amount of engine braking. In addition, the engine braking power amount may be adjusted via adjusting valve timing of the engine. For example, engine braking power may be increased via retarding intake valve closing time. Engine braking power may be decreased via advancing intake valve closing time. The engine may be rotated and accelerated to a rotational speed of the ISG to provide the desired engine braking power. By rotating and accelerating the engine to the rotational speed of the ISG, the engine may be coupled to the ISG via closing the driveline disconnect clutch in the event that driver demand power is increased. This may improve the driveline's response to the accelerator pedal position. Method 400 proceeds to exit.

In this way, engine braking may be provided to a driveline when a human driver positively affirms that engine braking is requested. Such operation may take guess work out of the controller, which may be particularly useful for vehicles that lack forward looking sensors. As such, improved initiation or activation of engine braking may be provided. Additionally, since engine braking may be affirmed by the human driver after engine rotation has ceased, the vehicle's occupants may expect changes in driveline noise levels that may accompany entry into engine braking.

Thus, the method of FIG. 4 provides for a powertrain operating method, comprising: via a controller, inhibiting rotation of an engine that has stopped rotating during conditions when engine braking is desired, except when input is received to the controller via a human/machine interface; and rotating the engine that has stopped rotating and initiating engine braking in response to the indication to permit engine braking. The method includes where the input is moving of a shifter lever. The method includes where the shifter lever is moved from a position of a higher gear to a position of a lower gear. The method includes where inhibiting rotation of the engine includes not allowing a starter to rotate the engine. The method includes where inhibiting rotation of the engine includes not allowing a driveline disconnect clutch to fully or partially close. The method includes where inhibiting rotation of the engine includes not allowing a belt driven integrated starter/generator to rotate the engine. The method includes where the engine that has stopped rotating has been automatically stopped rotating.

The method of FIG. 4 also provides for a powertrain operating method, comprising: requesting engine braking via a controller while an integrated starter/generator (ISG) lacks capacity to provide a desired level of driveline braking; receiving input via a human/machine interface that indicates a request for engine braking; and starting rotation of an engine that is not rotating via a controller in response to the requested engine braking and receiving input via the human/machine interface. The method includes where the input is adjustment of a position of a gear selector. The method includes where the input is an adjustment of a powertrain operating mode. The method includes where the adjustment of the powertrain operating mode includes entering a hill descent mode. The method includes where the engine is rotated via a starter. The method further comprises inhibiting starting rotation of the engine in response to a lack of a human performing the particular act and the requested engine braking.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
via a controller, inhibiting rotation of an engine that has stopped rotating during conditions when engine braking is desired, except when input is received to the controller via a human/machine interface; and
rotating the engine that has stopped rotating and initiating engine braking in response to the indication to permit engine braking.

2. The method of claim 1, where the input is moving of a shifter lever.

3. The method of claim 2, where the shifter lever is moved from a position of a higher gear to a position of a lower gear.

4. The method of claim 1, where inhibiting rotation of the engine includes not allowing a starter to rotate the engine.

5. The method of claim 1, where inhibiting rotation of the engine includes not allowing a driveline disconnect clutch to fully or partially close.

6. The method of claim 1, where inhibiting rotation of the engine includes not allowing a belt driven integrated starter/generator to rotate the engine.

7. The method of claim 1, where the engine that has stopped rotating has been automatically stopped rotating.

8. A powertrain operating method, comprising:
requesting engine braking via a controller while an integrated starter/generator (ISG) lacks capacity to provide a desired level of driveline braking;
receiving input via a human/machine interface that indicates a request for engine braking; and
starting rotation of an engine that is not rotating via a controller in response to the requested engine braking and receiving input via the human/machine interface.

9. The method of claim 8, where the input is adjustment of a position of a gear selector.

10. The method of claim 8, where the input is an adjustment of a powertrain operating mode.

11. The method of claim 10, where the adjustment of the powertrain operating mode includes entering a hill descent mode.

12. The method of claim 8, where the engine is rotated via a starter.

13. The method of claim 8, further comprising inhibiting starting rotation of the engine in response to a lack of a human performing the particular act and the requested engine braking.

14. A system, comprising:
an engine;
an integrated starter/generator (ISG) selectively coupled to the engine via a driveline disconnect clutch; and
a controller including executable instructions stored in non-transitory memory to rotate the engine from a non-rotating state in response to an engine braking request and an input received from a human, and not rotating the engine from the non-rotating state in response to the engine braking request and an absence of the input received from the human.

15. The system of claim 14, where the input is an adjustment of a state of a gear shift selector.

16. The system of claim 14, where the input is an adjustment of a state of a driveline mode selector.

17. The system of claim 14, further comprising additional instructions to automatically stop the engine in the non-rotating state.

18. The system of claim 14, further comprising additional instructions to rotate the engine at a rotational speed of the ISG in response to the engine braking request and the input received from the human.

19. The system of claim 14, further comprising additional instructions to provide driveline braking via the ISG in response to a driveline braking request.

20. The system of claim 19, further comprising additional instructions to generate the engine braking request via the driveline braking request.

* * * * *